July 9, 1963 E. A. MARGUS ETAL 3,096,965
BALL VALVE WITH ADJUSTABLE SEAT SEALS
Filed May 13, 1960 2 Sheets-Sheet 1
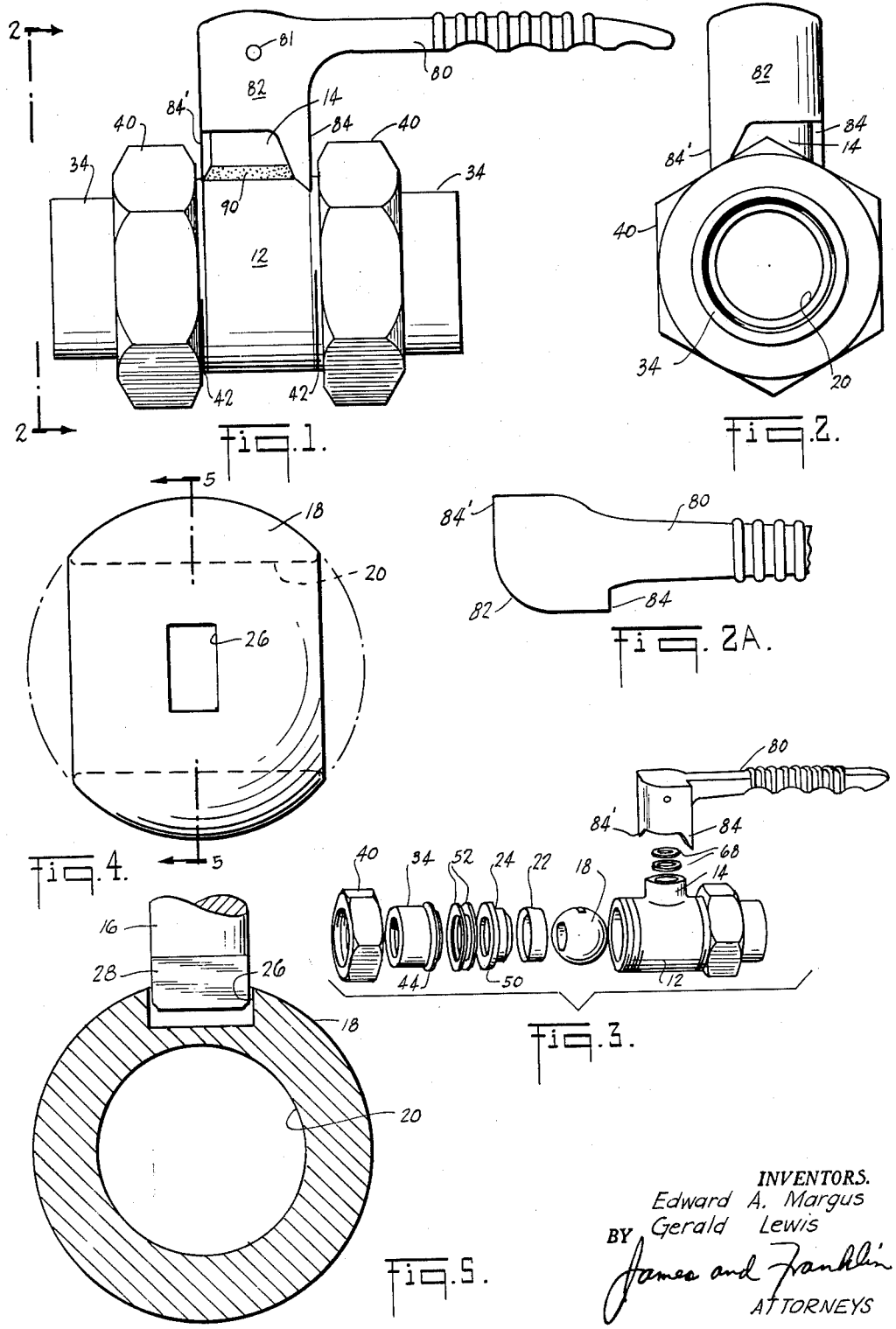
INVENTORS.
Edward A. Margus
Gerald Lewis
BY
James and Franklin
ATTORNEYS July 9, 1963  E. A. MARGUS ETAL  3,096,965
BALL VALVE WITH ADJUSTABLE SEAT SEALS
Filed May 13, 1960  2 Sheets-Sheet 2
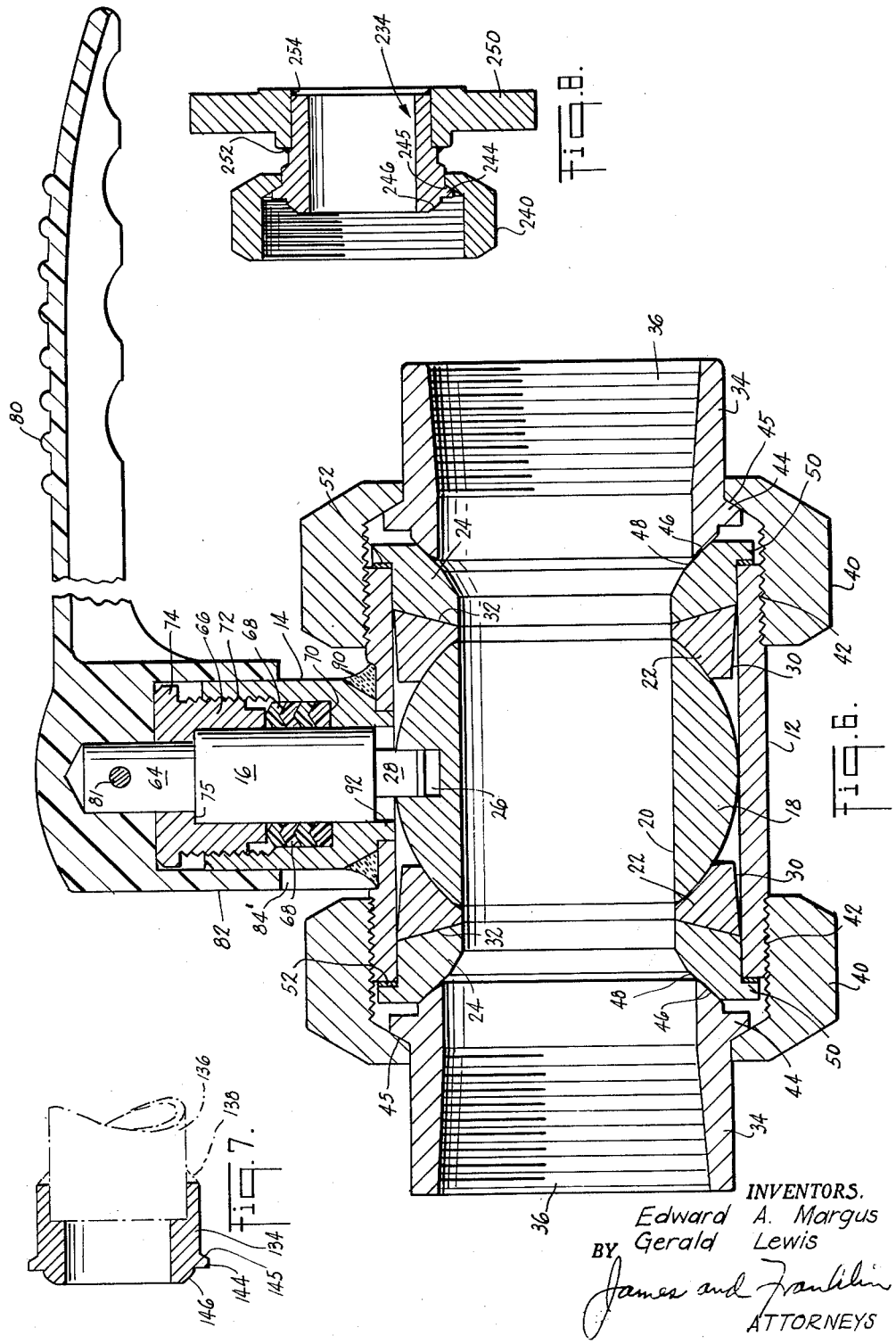
INVENTORS.
Edward A. Margus
Gerald Lewis
BY
James and Franklin
ATTORNEYS

United States Patent Office 3,096,965
Patented July 9, 1963

3,096,965
BALL VALVE WITH ADJUSTABLE SEAT SEALS
Edward A. Margus, Morris Plains, and Gerald Lewis, South Orange, N.J., assignors, by mesne assignments, to Manning, Maxwell & Moore, Incorporated, a corporation of New Jersey
Filed May 13, 1960, Ser. No. 29,088
4 Claims. (Cl. 251—170)

This invention relates to valves, and more particularly to ball valves.

The primary object of the invention is to generally improve ball valves. More specific objects are to reduce the cost of manufacture and assembly of such a valve; to simplify and facilitate its use in the field; to reduce the size of the valve relative to the size of the flow passage therethrough; and to provide a straight flow passage devoid of obstructions, pockets, and traps.

Another object is to provide valve seats which act also as seals to prevent leakage from the valve body. A further object is to provide means for adjustment to take up wear at the ball and seats. Still another object is to afford self-adjustable seating of the ball independently of its relation to the valve stem which turns it. A further object is to provide for a variety of types of piping connection (thread, flange, weld, etc.) without changing the main valve body. For this purpose separate nose pieces are used at the ends of the valve body, and in accordance with another feature and object of the invention, these preferably are adjustable relative to the valve body in order to accommodate any small misalignment of the piping in which the valve is installed.

To accomplish the foregoing objects, and other objects which will hereinafter appear, our invention resides in the ball valve elements and their relation one to another, as are hereinafter more particularly described in the following specification. The specification is accompanied by drawings in which:

FIG. 1 is an elevation of a ball valve embodying features of our invention;

FIG. 2 is an end view thereof;

FIG. 2a is a top view of the handle;

FIG. 3 is an exploded view showing some of the parts of the valve;

FIG. 4 is a plan view of the ball, drawn to larger scale;

FIG. 5 is a section through the ball on the line 5—5 of FIG. 4;

FIG. 6 is a longitudinal section through the valve;

FIG. 7 is a section drawn to smaller scale and showing a nose piece for socket weld piping; and FIG. 8 is a section showing another nose piece for flanged piping.

Referring to the drawing, and more particularly to FIG. 6, the valve comprises a generally cylindrical valve body 12, with a bonnet 14 carrying a valve stem 16. The body has a straight-through cylindrical inside wall. There is a rotatable ball 18 in the body, this being spherical except for a preferably cylindrical flow passage 20 extending diametrically therethrough. There are ring-like seats 22 within the body 12 on opposite sides of the ball 18. The inner faces of these seats conform to the spherical surface of the ball. Axially adjustable inserts 24 urge the seats 22 against the ball, and all of these parts provide a continuous straight through flow when the ball passage is aligned with the valve axis, as shown in FIG. 6. However, the valve is closed when the ball passage is perpendicular to the valve axis.

The top of the ball 18 is slotted at 26 (FIGS. 4, 5, and 6) to receive the lower end 28 of the valve stem 16. The part 28 is rectangular in cross section, and mates with the slot 26 of the ball, so that the ball is turned by the valve stem. However, the parts are not actually fastened together, and therefore some self-adjustment of the position of the ball is afforded, independently of the position of the valve stem.

The seats 22 are preferably made of a tetrafluoroethylene resin, such as the plastics material sold by the Du Pont Company under the trademark "Teflon." This has many advantages, including self-lubrication and resistance to corrosives, but materials other than this preferred material may be employed.

The outside wall 30 of the seat 22 is approximately cylindrical, but it is slightly convergent or frusto-conical toward the ball. This facilitates spread and conformity of the seats to the ball when the seats are urged inward. It has another practical advantage when the valve is being serviced in the field, in that it facilitates insertion of the seats in proper direction, and it discourages and even prevents insertion in the wrong direction, for the maximum diameter of the seats is somewhat larger than, and provides a very tight fit in the inside of the valve body 12.

The seats 22 act also as a sealing means to prevent leakage around the outside of the parts 22 and 24. For this purpose the inner ends 32 of the inserts 24, while generally transverse to the valve axis, are frusto-conical toward the ball, and the outer ends of the seats 22 mate with the inner ends 32 of the inserts. With this construction the axial pressure exerted by the inserts 24 against the seals 22 causes the seals to expand against the inside wall of the valve body 12. This eliminates the need for O-rings or other special seals to prevent leakage outwards toward the ends of the valve body.

The valve body 12 is completed by the addition of nose pieces 34 (FIGS. 1 and 6), which are adapted for connection into a pipe line. In the present case the nose pieces 34 are internally threaded at 36 (FIG. 6) for use with threaded pipe. However, a variety of other nose pieces may be provided for use with flanged piping, butt welded piping, socket welded piping, etc.

The nose pieces are assembled to the valve body by means of coupling nuts 40 (FIGS. 1, 2 and 6), and the valve body 12 is externally threaded at 42 to receive the nuts 40. The latter bear against flanges 44 on the outside of the nose pieces 34. The inner ends 46 of the nose pieces may bear against the outer ends 48 of the inserts 24, and in this way the coupling nuts 40 serve to hold the inserts 24 and valve seats 22, as well as the nose pieces 34.

However, it is preferred to make the ball seat adjustment independent of the coupling nuts 40, and therefore the inserts 24 are provided with end flanges 50 which are disposed outside of the ends of the valve body 12. Thin annular shims 52 are disposed between the flanges 50 and the outer ends of the valve body. These shims may have a thickness of about one hundredth of an inch, and when the valve is newly assembled several such shims are employed. Later, should it become necessary to take up wear between the ball 18 and the seats 22, one or more shims may be removed in the field. The adjustment of the pressure between the seats and the ball is determined by the shims 52. The shim adjustment may be used to maintain the central location of the ball, as well as to accommodate different operating pressures.

The inner ends 46 of the nose pieces are preferably spherically related to the outer ends 48 of the inserts, and the outer faces 45 of the flange 44 of the nose piece also may be spherical. This construction affords some slight angularity of the nose piece relative to the axis of the valve body, when needed, and thus accommodates some misalignment of the piping in which the valve is connected. In the present case the spherical radius of part 46 is about 1¾" for a 2" valve. The part 45, if not spherical, may be at an angle, say 30°. The resulting conical surface has somewhat the same accommodation, compared to a plane surface.

The valve stem 16 is stepped in diameter, the lower part being larger than the upper end 64. The bonnet 14 is larger in diameter than the valve stem, and the stem may be inserted or removed through the bonnet, and independently of the ball. The valve stem is held against removal by a metal gland 66. A plurality of packing rings 68 are disposed around the valve stem within the bonnet and bearing against a seat 70. The rings 68 are held by the gland 66 which is threadedly received in the bonnet, as shown at 72. The upper end 74 of the gland has the usual hexagon flats or other shape to facilitate tightening the same, but the corners are slightly rounded to reduce the maximum diameter. The said upper part of the gland is reduced in inside diameter at 75 and fits around the upper portion 64 of the valve stem.

The packing rings 68 are preferably V rings, as shown, except for lowest ring, which may act also as a support ring. They are preferably made of a tetrafluoroethylene resin such as "Teflon," although the use of that material at this point is not as important as its use for the seats 22.

The upper portion 64 of the stem receives and is operated by a handle 80. This has a hole dimensioned to mate with the upper portion of the valve stem, and in addition, has a relatively large diameter skirt 82 which is received around the gland 74 and the bonnet 14. This improves the appearance of the valve and strengthens the handle. A cross pin 81 secures the handle to the valve stem.

The skirt 82 is projected downward to form a combined pointer and stop 84. This is so shaped and located relative to the valve body that it acts as a motion limiting stop. It permits turning of the handle through a one-quarter turn, at which time it engages the valve body as shown in FIG. 1 for the open position of the valve. When the handle is turned to closed or crosswise position, the stop moves to a corresponding position at the left (as viewed in FIG. 1) where it again engages the body.

The handle is preferably molded out of plastics molding material, and the handle 80, skirt 82 and stop 84 are all molded integrally. The handle may be and preferably is provided with two similar stops, the other being indicated at 84', and being diametrically opposite the stop 84. This is shown also in FIG. 2A. Both stops absorb the stopping force when the handle is swung all the way, and in both cases the range of movement permitted by the stop is substantially 90 degrees, this 90 degree arc being displaced 45 degrees from the 90 degree arc described by the handle itself.

To accommodate other forms of pipe, only the nose pieces 34 need be changed when manufacturing the valve. FIG. 7 shows a nose piece 134 arranged for socket-weld piping, the end of a pipe being indicated in broken lines at 136, with a welding seam indicated at 138. The flange 144 corresponds to the flange 44 in FIG. 6, and there is an arcuate surface 146 corresponding to the arcuate surface 46 in FIG. 6. The arcuate or conical surface at 145 corresponds to the similar surface at 45 in FIG. 6.

FIG. 8 shows a nose piece intended for use with flanged piping. In this case the nose piece 234 is shown assembled with its coupling nut 240, because in this particular case, unlike all others, the nose piece and nut are not separable. This is so because the flange 250 itself prevents removal of the coupling nut 240. To permit assembly the flange therefore is not made integral with the rest of the nose piece, and instead they are assembled by welding, as is indicated at 252 and 254. The inner flange 244 of the nose piece corresponds to the flange 44 in FIG. 6, and the arcuate surfaces 245 and 246 correspond to the surfaces 45 and 46 in FIG. 6.

It will be understood that other nose pieces may be made to accommodate other kinds of piping or special hydraulic connections.

The succession of parts when assembling the valve may be briefly reviewed with reference to FIG. 3, in which it will be seen that the ball 18 is followed by the seat-and-seal 22, which in turn is held by the insert 24. The shims are shown at 52, but it will be understood that these are disposed around the insert 24 ahead of the flange 50. The insert is itself held by the nose piece 34, and the latter is clamped on the valve body 12 by means of coupling nut 40, which is received around the nose piece and bears against the flange 44.

To assemble the valve stem portion, the valve stem (not shown in FIG. 3) is dropped through the bonnet until its lower end engages the slot in the top of the ball. The V rings 68 could be around the stem at this time, or are added later. The threaded gland (not shown in FIG. 3) is then screwed into position, following which the handle 80 is slid over the valve stem and valve bonnet, and is then secured in place by driving the cross pin into position. The cross pin may be slightly tapered, in accordance with known practice.

The valve body 12 and bonnet 14 may be integrally cast when manufactured in sufficient volume. When manufactured in smaller quantity for any one size of valve, the bonnet may be made separately and welded to the valve body. Such welding is indicated at 90 in FIG. 6, and with this two-part construction the lower end of the bonnet is preferably received in the valve body as shown at 92. The welding on the outside may supply sufficient material to fillet the junction of the bonnet and body with a rounded appearance resembling that of a cast body, or as shown in FIG. 3 of the drawing.

It is believed that the construction and method of assembly of our improved ball valve, as well as the advantages thereof, will be apparent from the foregoing detailed description. The valve is compact relative to its inside port dimension. It requires only a small number of simple parts, and is easily installed and maintained. In operation it throttles gradually like a globe valve; it is capable of handling slurries and abrasives like a plug valve; and it has a positive on-and-off action like a gate valve.

The handle design is such that it is readily made of a molded plastics material, and so provides insulation from high or low temperature piping. Moreover, the plastics handle may be provided in a variety of colors for ready identification in accordance with a color code or scheme for complex piping. The skirt on the handle acts as a spray guard for greater safety to the operator, in the event of leakage from the valve stem. Leakage is minimized by the use of V ring packing, and the valve may be packed while under pressure.

The slotted drive connection between the valve stem and ball minimizes wear of both the ball and the valve stem by affording some slight relative self-adjustment or self-seating of the parts. The valve seats have broad contact area for good cut-off and minimum wear, and the seats act also as seals, thereby eliminating the need for additional O rings or other gaskets. The broad seat surfaces provide enough friction for self-locking of the valve in any desired position. The separate nose pieces provide self-alignment with the piping. The adjustment of the inserts prolongs the life of the parts and minimizes maintenance by permitting adjustment of the seal or loading to accommodate the liquid pressure being handled. Less friction may be provided at the seat when handling low pressure liquid, but the same valve may be adjusted in another installation to handle high pressure liquids. The separate nose pieces make it possible to use the same valve parts, except for the nose pieces, for all kinds of piping, including screwed, flanged, and welded piping, as well as other special hydraulic connections.

The valve is readily and quickly disassembled for servicing or cleaning, and there is easy access to all of the internal parts. The valve can be used in any position, with the valve stem at the side or bottom, instead of at top. The valve, when open, provides a straight through unobstructed flow with minimum turbulence, and without pockets for the entrapment of solids. The flow may be in either direction. No special tools are needed for servicing. Depending on the nature of the liquid to be handled, the valve may be made of stainless steel, carbon steel, brass, plastics materials, or other alloys and materials.

It will be understood that while we have shown and described the invention in a preferred form, changes may be made in the structure shown without departing from the scope of the invention, as sought to be defined in the following claims.

We claim:

1. In a ball valve, having a generally cylindrical valve body and a rotatably spherical valve member for controlling fluid flow through the valve disposed within a generally cylindrical inner wall of the body; means at each end of the valve body retaining and sealing the valve member within the body comprising a generally cylindrical insert telescopically received within one end of the body, and a generally annular seal engaged between the insert and the valve member, the insert and seal having mating frusto-conical end surfaces tapering inwardly of the valve body and toward the valve member, the peripheral surface of said being frusto-conical and tapering inwardly of the valve body, a substantial portion of said peripheral surface being spaced from the inner wall of the valve body, the seal being provided with a third surface sealingly and slidably engaged with the valve member and disposed generally opposite to the frusto-conical end surface of the seal, said insert being adjustable axially of itself to vary the wedging force between said insert and seal.

2. The ball valve as described in claim 1 in which the portion of said peripheral surface of the seal next adjacent said insert is sealingly engaged with the inner wall of the valve body, said insert being slidably received in one end of the valve body, and means mounted on the valve body for adjustment axially of the said insert and retaining said insert in the valve body.

3. A ball valve as described in claim 1 in which the outer end of said insert terminates in a convex surface sloping generally radially and longitudinally outwardly of the insert, a generally cylindrical nose piece generally aligned with said insert and having a convex end surface in engagement with the convex end surface of the nose piece, a radially outwardly extending annular flange on the nose piece, said flange having a surface facing generally away from the valve body and inclined outwardly of the nose piece and toward said insert, and a retaining member threadably mounted on the valve body for movement axially of said insert and having a generally inclined surface in overlying engagement with said inclined surface on the flange, whereby the nose piece and insert are maintained in assembly with the valve body and at least some axial misalignment is permitted between said nose piece and insert.

4. In a ball valve, a generally cylindrical valve body, a spherical valve member disposed within the body, a pair of annular seals concentrically disposed within opposite ends of the valve body and forming opposed seats for the valve member, means for retaining said valve member and seals in assembly within the body comprising a pair of aligned generally cylindrical inserts telescopically and slidably received within opposite ends of the valve body in alignment with said seals, each of said inserts having a convex surface facing generally outwardly of the valve body, a nose piece generally aligned with each insert and having a convex end surface in engagement with the convex end surface of the insert, each insert further having a generally annular external surface facing outwardly of the valve body and inclined outwardly of the nose piece and toward said insert, and a retaining collar respectively associated with each nose piece, each collar being threadably mounted on the valve body for movement generally longitudinally of the nose piece and having an inclined surface in engagement with the inclined surface on the nose piece, whereby the nose piece is retained in assembly with the insert and the insert is retained with the valve body with at least some axial misalignment being permitted between the nose piece and insert.

References Cited in the file of this patent

UNITED STATES PATENTS

| 850,622 | Clark | Apr. 16, 1907 |
| 908,414 | Mellin | Dec. 29, 1908 |
| 982,446 | Smith et al. | Jan. 24, 1911 |
| 2,722,401 | Till et al. | Nov. 1, 1955 |
| 2,861,773 | Clade | Nov. 25, 1958 |
| 2,885,179 | Hartman | May 5, 1959 |
| 2,912,217 | Freeman et al. | Nov. 10, 1959 |
| 2,989,990 | Bass et al. | June 27, 1961 |

FOREIGN PATENTS

| 254,134 | Italy | 1927 |